June 1, 1943.  S. D. REDMOND  2,320,986
MINE SWEEPER
Filed Feb. 19, 1940
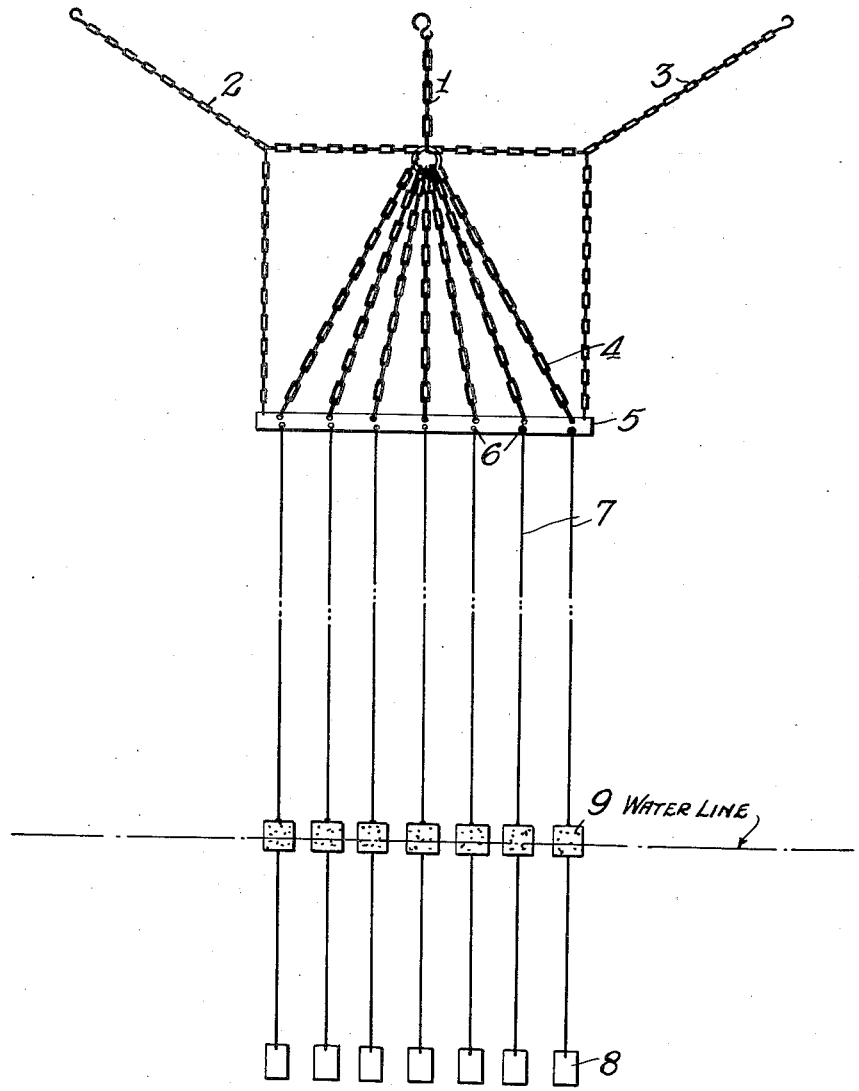
Inventor
Sidney D Redmond Patented June 1, 1943

2,320,986

UNITED STATES PATENT OFFICE 2,320,986

MINE SWEEPER

Sidney D. Redmond, Jackson, Miss.

Application February 19, 1940, Serial No. 319,795

1 Claim. (Cl. 114—221)

This invention relates to mine sweepers, and more particularly to that type of mine sweeper that is adapted for use with aircraft.

An object of this invention is to provide a device that may be used with aircraft in mine infested areas to rid such areas of magnetic, as well as contact, mines by causing the explosion and consequent destruction thereof with a minimum degree of risk.

Another object is to provide such a device which makes it possible that the location and destruction of mines over a greater area may be speedily effected.

A still further object is to provide a device of the nature to be hereinafter described which may be cheaply constructed and which may be attached to an aircraft with a minimum of time and labor.

Other objects and advantages in my invention will be apparent from the following detailed description of the accompanying drawing, in which The drawing is a detail view showing my invention.

Referring now to the drawing, I provide a chain 1 which is to be attached by any suitable means to the aircraft when ready for use, and chains 2 and 3 which are to be attached to the sides thereof. I provide a bar 5 having several apertures 6 therein, and between said bar and the chains 1, 2 and 3, I provide reinforcing chains, or cables 4. In said apertures 6, I secure lines 7, which may be either rope or cable, and which have at their lowermost ends detecting metallic plates 8. Interposed between said plates and the bar 5 on the lines 7 are floats 9, which keep said plates 8 at a pre-determined depth in the water.

The elements 1, 2 and 3 or the elements 1', 2' and 3' constitute spaced flexible couplers. The elements 4, 5 or the elements 4', 5' correlate to provide a reinforced skeleton flexible suspension which is to be connected to an aircraft by the flexible couplers. The elements 7 or 7' form spaced elongated flexible sweeps each carrying a float and a detecting metallic plate.

The device thus described and illustrated, when lowered into and dragged through the mine infested area by the aircraft, causes the destruction of various types of mines, and more particularly of magnetic mines.

It is to be understood that my invention is not limited to the specific details of construction illustrated on the accompanying drawing, but that said details may be varied in the practical carrying out of my invention without departing from the spirit thereof.

Having thus described my invention, I claim:

In a mine sweeper for attachment to and for disposing in depending relation with respect to a towing craft, said sweeper including a skeleton structure formed of a bar, a series of flexible members attached to and extending from one side of the said bar and other spaced flexible members attached to said series of members and adapted to be connected to the craft, and a plurality of spaced elongated parallel flexible independent sweeps attached at one end to and extending from the other side of the said bar and each being provided at its other end with a detecting metallic plate and intermediate its ends with a float for suspending the plate.

SIDNEY D. REDMOND.